(12) United States Patent
Dickson

(10) Patent No.: US 7,658,034 B1
(45) Date of Patent: Feb. 9, 2010

(54) PLANT CONTAINER

(76) Inventor: John Dickson, 12904 Ardennes Ave., Rockville, MD (US) 20851

( * ) Notice: Subject to any disclaimer, the term of this patent is extended or adjusted under 35 U.S.C. 154(b) by 0 days.

(21) Appl. No.: 12/314,108

(22) Filed: Dec. 4, 2008

(51) Int. Cl.
    *A01G 9/02* (2006.01)
(52) U.S. Cl. ..................................... 47/66.1
(58) Field of Classification Search ............ 47/39, 47/66.1, 81, 83; 206/423; 220/571, 628
    See application file for complete search history.

(56) References Cited

U.S. PATENT DOCUMENTS

| | | | | |
|---|---|---|---|---|
| 1,858,902 A | * | 5/1932 | Prantl | 47/66.1 |
| 2,379,549 A | * | 7/1945 | Supplee | 47/81 |
| 2,617,617 A | * | 11/1952 | Krastel et al. | 47/40.5 |
| 2,846,107 A | * | 8/1958 | Orter | 217/12 R |
| 2,937,617 A | * | 5/1960 | Brody et al. | 119/51.5 |
| 3,076,289 A | * | 2/1963 | Gallo | 47/83 |
| 3,076,290 A | * | 2/1963 | Gallo | 47/83 |
| 3,687,409 A | * | 8/1972 | Cook | 248/151 |
| 4,527,354 A | * | 7/1985 | Sellier | 47/81 |
| 4,880,156 A | * | 11/1989 | Wallet | 232/43.1 |
| 4,887,731 A | * | 12/1989 | Pett et al. | 220/1.5 |
| 4,962,614 A | * | 10/1990 | Koerper | 47/66.1 |
| 5,269,095 A | * | 12/1993 | Helfman et al. | 47/65.5 |
| 6,418,664 B1 | * | 7/2002 | Shaw | 47/79 |
| 6,783,023 B1 | * | 8/2004 | Fan | 220/571 |
| 2009/0119987 A1 | * | 5/2009 | Ingrassia | 47/66.5 |

* cited by examiner

*Primary Examiner*—Francis T Palo
(74) *Attorney, Agent, or Firm*—James G. O'Boyle, Esq.

(57) ABSTRACT

A plant container having a plurality of holes in the bottom thereof, a plurality of legs are detachably connected to certain holes in the bottom thereof, and a length of wick extends through other holes in the bottom of the container.

2 Claims, 3 Drawing Sheets

PLANT CONTAINER

BACKGROUND OF THE INVENTION

Conventional plant containers or pots have holes in the bottom for draining excess water or nutrient to prevent plant damage. When the containers are placed in a tray containing water or nutrient, the plant can be easily damaged if over watered. It has been proposed to provide the plant containers with legs so that the bottom of the container is positioned above the surface of the fluid in the tray and a wick extends through the holes in the bottom of the container for drawing fluid from the tray into the container.

While these containers have been satisfactory for their intended purpose, they have been characterized by certain disadvantages. For instance, heretofore, the legs have been integrally formed with the container, thus making the container more expensive to manufacture than a conventional container without the legs, and a fastener was required for holding the wick in the respective hole in the bottom of the container.

SUMMARY OF THE INVENTION

After considerable research and experimentation, the plant container of the present invention has been devised to overcome the disadvantages experienced with previous elevated plant containers, and comprises, essentially, a conventional plant container having holes in the bottom thereof; legs are detachably connected to the container, and a length of wick extends upwardly and inwardly of the container through one of the holes in the bottom of the container and then downwardly and outwardly through another hole in the bottom of the container.

By this construction and arrangement of the plant container of the present invention, legs can be attached to an off-the-shelf plant container and a wick can extend through the container without requiring any fasteners for securing the wick therein.

DETAILED DESCRIPTION OF THE PREFERRED EMBODIMENT

Figure 1:
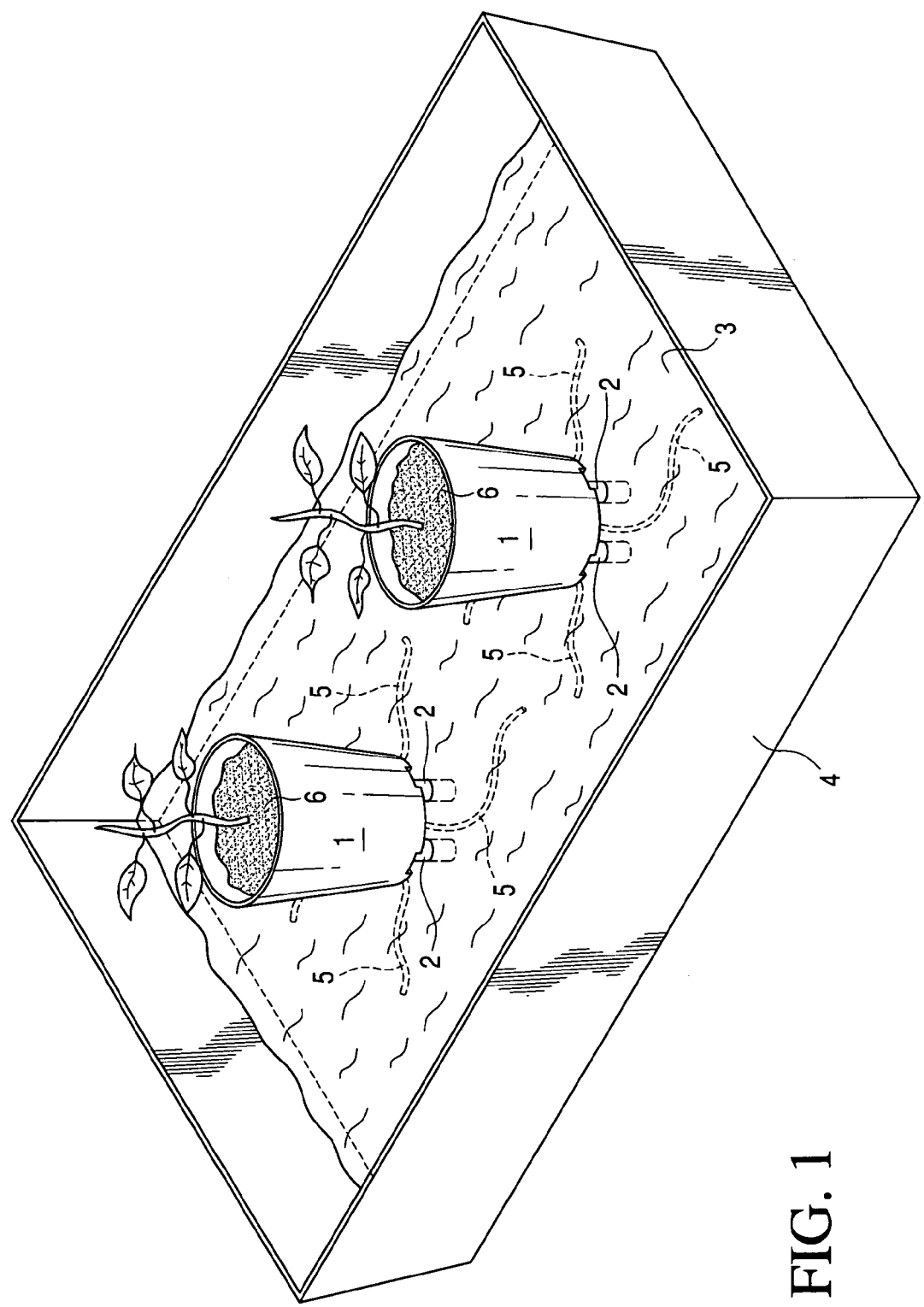
FIG. 1 is a perspective view of a pair of plant containers of the present invention standing in a tray of fluid.

Referring to the drawings and more particularly to FIG. 1, the plant container 1 of the present invention comprises a conventional, molded plastic container having legs 2 detachably connected to the bottom of the container for supporting the container 1 in an elevated position above the surface of a fluid 3, such as a plant nutrient or water contained in a tray 4. Wicks 5 extend from the fluid 3 into the bottom of the container 1 for conveying the fluid 3 from the tray 4 into the growing medium 6 in the container 1.

Figure 2:
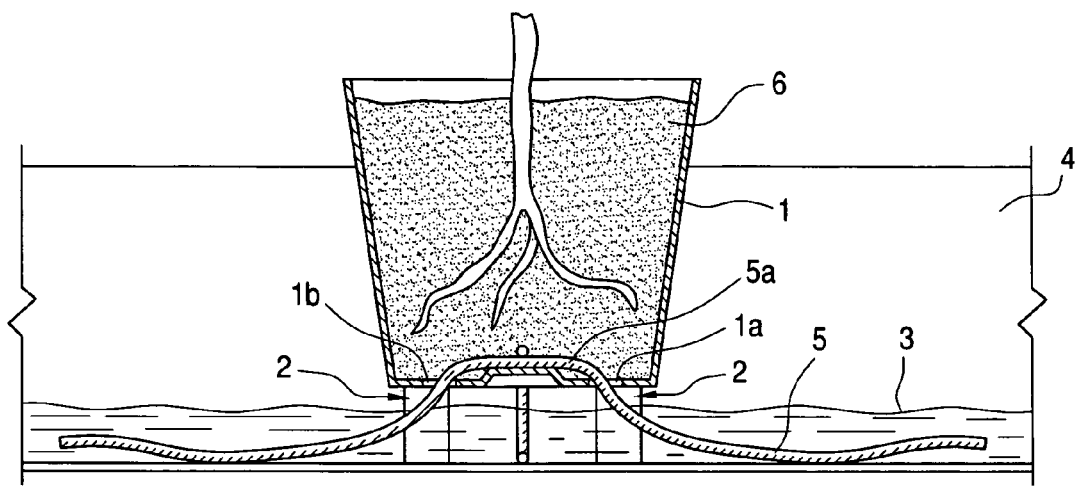
FIG. 2 is a sectional side elevational view of one of the containers shown in FIG. 1.
Figure 3:
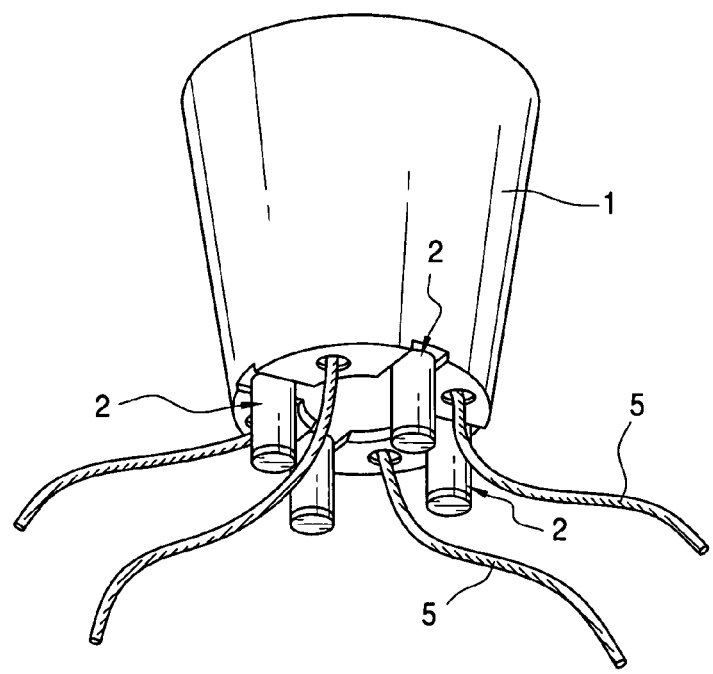
FIG. 3 is a bottom perspective view of one embodiment of the container of the present invention.
Figure 4:
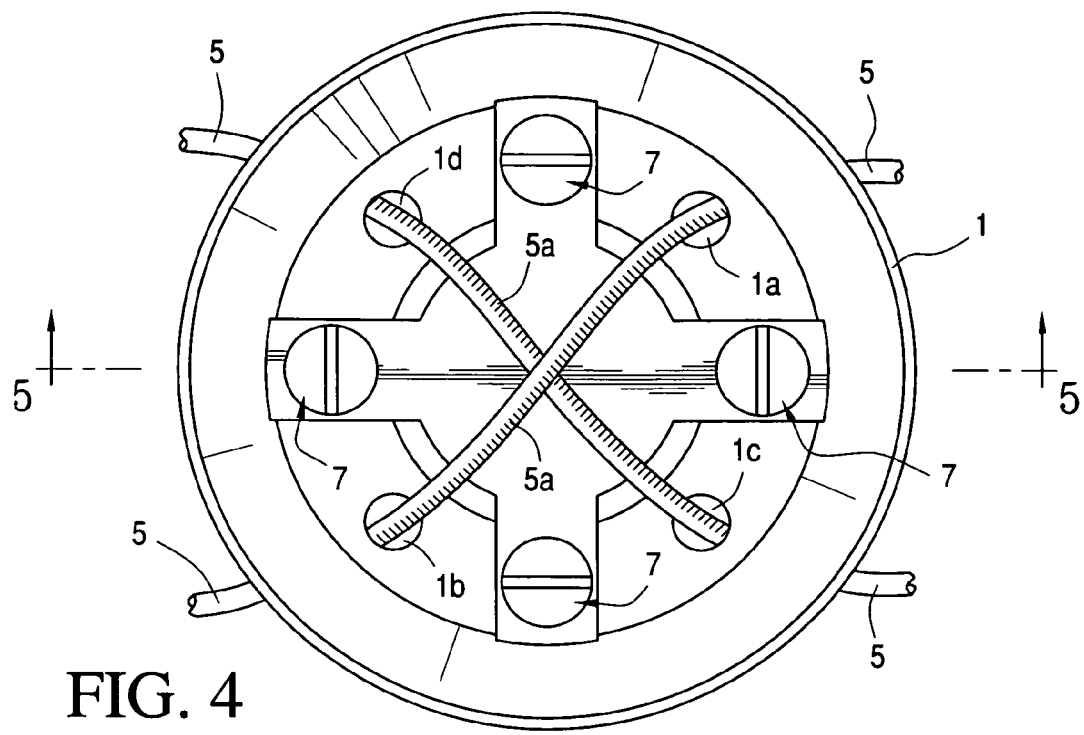
FIG. 4 is a top plan view of another embodiment of the container of the present invention.

As will be seen in FIGS. 2 and 3, each wick 5 comprises a length of cord, such as braided cotton cord, extending upwardly into the container 1 through a hole 1a provided in the bottom of the container across the bottom of the container 1, and then downwardly and outwardly of the container 1 through another hole 1b in the bottom of the container. The portion 5a of the wick 5 within the container forms a loop for holding the wick 5 in the container. While FIG. 2 shows one length of wick 5, FIGS. 3 and 4 show the use of two lengths of wick 5 wherein the second wick 5 extends through the holes 1c, 1d provided in the bottom of the container.

Figure 5:
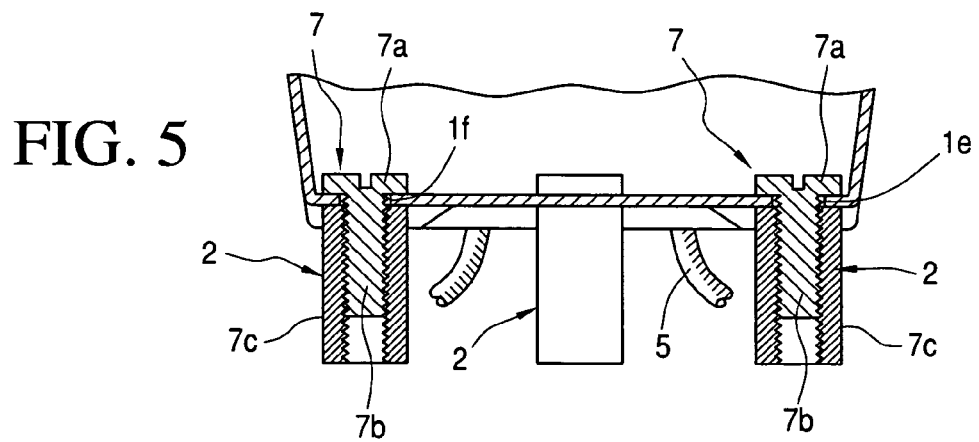
FIG. 5 is a sectional side elevational view taken along line 5-5 of FIG. 4.
Figure 6:
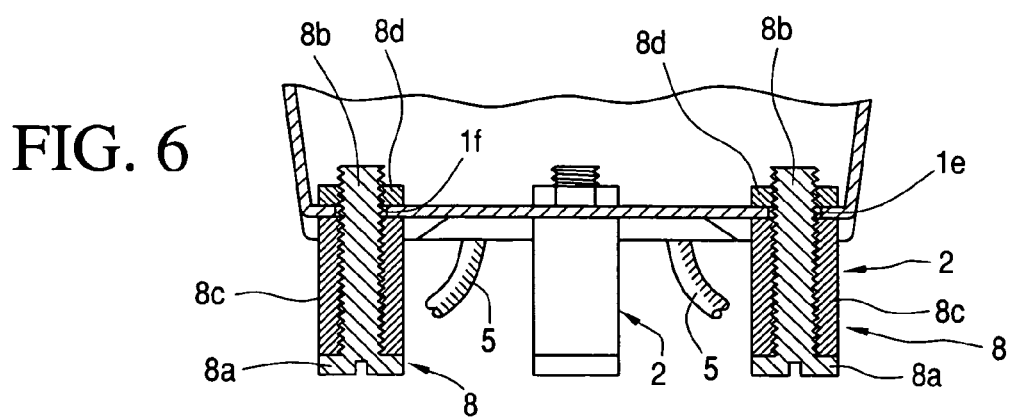
FIG. 6 is a fragmentary sectional side elevational view of the container shown in FIG. 3.

FIGS. 5 and 6 illustrate two embodiments of the detachably mounted legs for the container 1. In one embodiment, each leg 2, as shown in FIG. 5, comprises an elongated bolt 7 having a head 7a and a threaded stem 7b extending downwardly through a respective hole 1e and 1f and fastened therein by an elongated tubular nut 7c threaded onto the bolt stem 7b.

In the other embodiment of the leg 2, as shown in FIG. 6, an elongated bolt 8 having a head 8a and a threaded stem 8b extends upwardly through an elongated tubular spacer 8c and through the respective holes 1e, 1f in the bottom of the container and secured therein by nuts 8d threaded onto the bolt stem 8b.

From the above description, it will be appreciated by those skilled in the art that the plant container of the present invention is an improvement over prior plant containers having legs integrally connected thereto in that in the instant invention, a conventional off-the-shelf type plant pot or container can be used and supporting legs can be attached to the containers, and by the construction and arrangement of the wicks extending through the holes in the bottom of the container, fasteners are not required to hold the wicks in place.

It is to be understood that the form of the invention herewith shown and described is to be taken as a preferred example of the same, and that various changes in the shape, size and arrangement of parts may be resorted to without departing from the spirit of the invention or scope of the subjoined claims.

I claim:

1. In a plant container having a plurality of holes in the bottom thereof, the improvement comprising:
    a plurality of legs detachably connected to the container, and means for detachably connecting the legs to the container, wherein each leg comprises an elongated bolt having a head and a threaded stem, said stem extending downwardly through a respective hole in the bottom of the container, and an elongated tubular nut threaded onto said stem to thereby fasten the stem in said hole;
    wick means comprising a length of wick material, said length of wick material extending upwardly into the container through a hole in the container, said wick extending across the bottom of the container and then downwardly and outwardly of the container through another hole in the bottom of the container, the portion of the wick within the container forming a loop, whereby the wick is held in the container.

2. In a plant container having a plurality of holes in the bottom thereof, the improvement comprising:
    a plurality of legs detachably connected to the container, and means for detachably connecting the legs to the container, wherein each leg comprises an elongated bolt having a head and a threaded stem, and a elongated tubular spacer, said stem extending upwardly through said elongated tubular spacer and into a respective hole in the bottom of the container, and a nut threaded onto the end portion of the stem, whereby the leg is secured to the bottom of the container;

wick means comprising a length of wick material, said length of wick material extending upwardly into the container through a hole in the container, said wick extending across the bottom of the container and then downwardly and outwardly of the container through another hole in the bottom of the container, the portion of the wick within the container forming a loop, whereby the wick is held in the container.

* * * * *